Patented Apr. 14, 1942

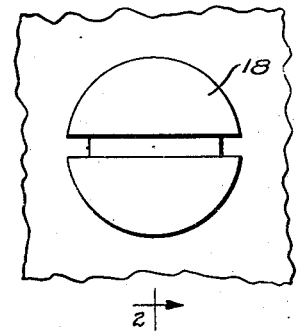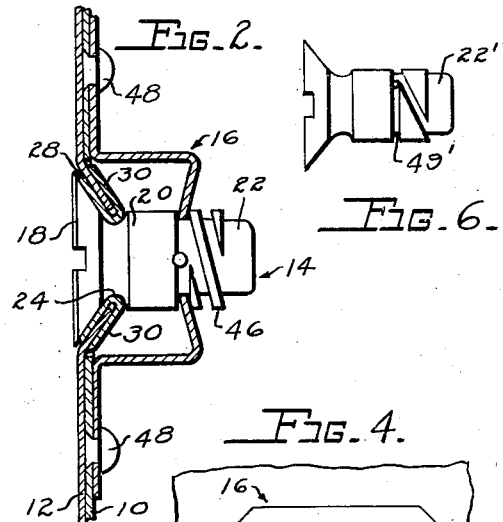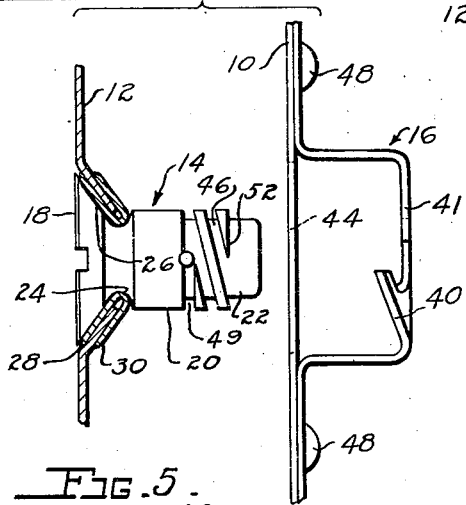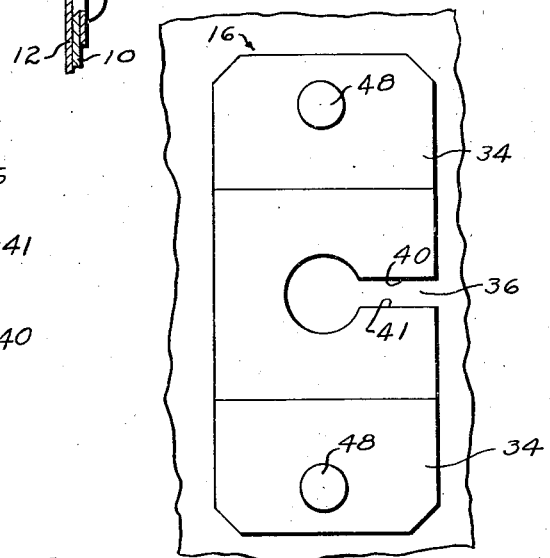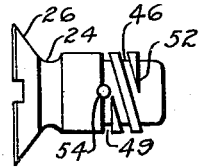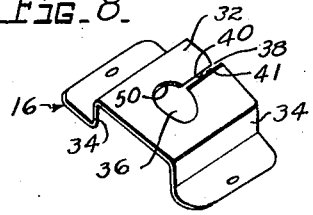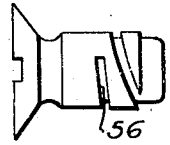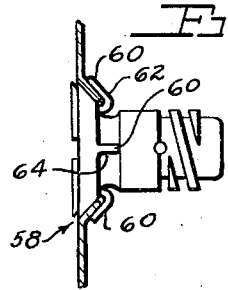

2,279,343

UNITED STATES PATENT OFFICE 2,279,343

COWLING FASTENER

William O. Reeser, Buffalo, N. Y.

Application November 15, 1940, Serial No. 365,799
12 Claims. (Cl. 24—221)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved means of securing articles, and is especially useful in connection with aircraft cowlings.

It is believed that the invention and its advantages will be clearly understood from the following description and the accompanying drawing wherein like reference numerals indicate like parts throughout the several views, and wherein:

Fig. 1 is a plan view of the complete assembly, showing the parts secured together, in broken edges;

Fig. 2 is a sectional view on the line 2—2 of Fig. 1;

Fig. 3 is a side view of the screw and support in position prior to assembly, with the cowling and screw retainer in section;

Fig. 4 is an elevational view of the retaining member secured to the support structure;

Fig. 5 is an elevational view of one form of the screw;

Fig. 6 is an elevational view of a second form of the screw;

Fig. 7 is an elevational view of a third form of the screw;

Fig. 8 is a perspective view of the retaining member; and

Fig. 9 is a view showing a modification of my invention for securing the screw to the cowling.

Referring to the drawing, I have shown a cowling support 10 and a cowling 12, secured together by my novel anchoring arrangement consisting, as illustrated, of a screw 14 that is preferably permanently retained in the cowling, and a retaining member 16 that is fixedly attached to the cowling support.

The screw has a head portion 18, a shank portion 20, a pilot portion 22, and an annular groove 24 adjacent the head portion. The shank portion is provided with a thread, as more particularly described hereinafter. The cowling is preferably conically countersunk to receive the conical face 26 of the screw head. Disposed intermediate the screw head and the countersunk portion of the cowling is a grommet-like member 28. This member has its lower edge 30 crimped back upon the underside of the cowling, and the rounded edge formed thereby engages the groove 24 to thus secure the screw to the cowling in rotatable relation.

The retaining member (best seen in Fig. 8) is in the form of a yieldable bracket made of a resilient metal such as spring steel. It has a substantially flat plate portion 32 and a pair of legs 34 for spacing the flat plate portion from the cowling support when the retaining member is attached thereto. The flat plate portion has a central opening 36 therein of a diameter complemental to the screw, and is further provided with a slot 38 extending radially from the opening to the outer periphery of the flat plate portion, as illustrated, said slot having its sides 40 and 41 displaced from each other, or a portion along side 40 deflected, in order to provide a leading edge for engagement with the screw thread. One or more slots may be employed. If more than one slot is used, the slots should stop short of the outer periphery of the flat plate portion.

The cowling support 10 is provided with an aperture 44 in registry with the screw as mounted in the cowling, for receiving the screw. The retaining member 16 is fixedly, permanently secured to the inwardly presenting face 46 (side opposite the joining surface) of the cowling support by means of rivets 48, as illustrated, with the opening 36 in the flat plate portion in registry with the screw and aperture 44 in the cowling support.

The thread 46 on the shank portion 20 of the screw is of sufficient width to receive plate 16 and is preferably square-shaped to provide force components acting in the direction of the axis of the screw to thereby counteract any tendency of outward disengagement of the edge of opening 36 when the screw engages the retaining plate portion 32. Near the base of the shank portion of the screw, the thread 46 merges in a connecting, or annular, groove 49 lying in a plane substantially normal to the axis of the screw to thereby receive the retaining plate with the edge 50 of opening 36 out of engagement with the pitch portion of the thread so that when the retaining plate has been fully engaged by the screw, there will be no tendency for the screw to become disengaged due to the action of the inclined surface or pitch of the screw thread. This feature thereby serves as a means for locking the screw against disengagement.

The spacing of the plate portion 32 from the cowling support 10, and the length of the screw, are corelated so that the leading edge 52 of the screw thread will engage the leading edge 40 of the flat plate portion 32 when the cowling and cowling support are placed together. The length of the screw thread portion is such that the retaining plate 16 will be drawn in sufficiently toward the cowling by engagement with the screw, to provide the desired tension for holding the cowling to the cowling support, when said plate has been received in groove 49.

To enable disengagement of the screw from the retaining plate when desired, there is provided in the annular groove 49 adjacent the point of merging of the screw thread, a pin 54 or other cam-like abutment which serves to provide a rise for the trailing edge 41 of the retaining plate portion so that it will engage the thread 46 upon rotation of the screw in a direction opposite to the direction of rotation for engagement. Because of the torsion stress introduced into the flat plate portion when in engagement with the pitch of the thread, there is a greater resistance to rotation of the screw in the direction of disengagement than there is in the direction of engagement, once the flat plate portion has been received in the annular groove 49.

It should be noted that the thread 46 on the shank portion of the screw is preferably as steep pitched as the flexing of the retaining member 16, during engagement, will permit, to thereby enable engagement and disengagement with a minimum of rotation of the screw. This results in practice in the provision of a thread ranging from one revolution to a fraction of a revolution, as shown in Fig. 6, in which latter case the thread is a helical incline connecting the pilot portion 22' at the point of the screw with the annular groove 49' at the base.

A variation in the threading may be made as in Fig. 7, wherein there is shown a screw having a portion 56 of the thread at the bottom of the threaded portion of a helical angle or pitch less than the helical angle or pitch of the thread portion immediately preceding, said portion of less pitch extending around the screw a distance sufficient to receive the edge of the aperture 50 in the flat plate portion adapted to engage therewith.

A further advantage of my cowling fastener is that the same is self-aligning to a considerable extent by virtue of the initial ready engagement of the pilot portion 22 of the screw with the aperture 36 in the retaining member, and by virtue of the displaceability of the retaining member during engagement of the screw, due to the flexibility of its legs 34.

It will thus be seen that I have provided a cowling fastener which enables the cowling to be quickly and readily secured to its support; which is capable of providing the desired amount of tension for holding the cowling to the support; which is provided with means for preventing inadvertent disengagement of the screws; which is substantially self-aligning during assembly; and which is economical to manufacture.

The modification of my invention shown in Fig. 9 may be employed with any suitable screw, and is illustrated with a screw similar to that shown in Fig. 5, but differs in the grommet member for retaining the screw in the cowling. The grommet member 58 shown in Fig. 9 is conically shaped similar to the grommet member 28, but is formed with a plurality of prongs 60 at its inner edge. Some of these prongs are adapted to be crimped over the cowling as at 62 to engage the cowling in a manner similar to the grommet-like member 28, and the other prongs are adapted to be pressed into groove 24 of the screw adjacent its head, as at 64, for engagement with the screw to retain same in the cowling.

It is believed that the many advantages of the fastening device constructed in accordance with the present invention will be readily understood. The language and expressions which have been employed throughout the specification are used as terms of description only and not of limitation, and said terms are intended to include all the equivalents and modifications as are possible to be employed within the scope of the appended claims.

I claim:

1. In combination, a pair of members to be connected, provided with openings to register with one another, one of said members having a yieldable plate element spaced from said member and fixedly secured thereto, said plate element having an opening therein registering with said first-mentioned openings and having a slot extending outwardly from said opening, a screw element rotatably mounted in the opening in the other of said members, said screw element being provided with a helical thread for engagement with said plate element to thereby connect said members, the thread of said screw element merging in a groove intermediate the thread and the head of said screw and lying in a plane substantially normal to the axis of said screw, said groove being positioned to receive the plate element in tensioned relation when the members are connected together.

2. In combination, a pair of members to be connected, provided with openings to register with one another; one of said members having a screw rotatably mounted in the opening thereof; the other of said members having fixedly secured thereto a substantially flat plate yieldable element spaced from the member to which it is secured, having a slot therein, having a portion thereof formed to register with said first-mentioned openings, and having a portion along said slot deflected to enable initiation of threading engagement with said screw, said screw element having a threaded shank portion and a head portion and being adapted to threadedly engage said yieldable element to thereby connect said members, said thread terminating at the base of said shank portion in a substantially circumferential portion having a helical angle materially less than the helical angle of the immediately adjacent portion to enable rotation of said screw element in the direction of engagement with said plate member with less resistance than rotation of said screw element in the direction of disengagement when said plate member is in engagement with said circumferential portion.

3. In combination, a pair of members to be connected, provided with openings to register with one another, one of said members having a yieldable plate element spaced from said member and fixedly secured thereto, said plate element having an opening therein registering with said first-mentioned openings and having a slot extending outwardly from said opening, a screw element rotatably mounted in the opening in the other of said members, said screw element being adapted for threaded engagement with said plate element to thereby connect said members, the thread of said screw element merging at the base thereof in a groove lying in a plane substantially normal to the axis of said screw and located on said screw so as to receive said plate element when the members are connected together.

4. In combination, a pair of members to be connected, provided with openings to register with one another; one of said members having a screw rotatably mounted in the opening thereof;

the other of said members having fixedly secured thereto a substantially flat plate yieldable element spaced from the member to which it is secured, having a slot therein, having a portion thereof formed to register with said first-mentioned openings, and having a portion along said slot deflected to enable initiation of threading engagement with said screw; said screw element being adapted to threadedly engage said yieldable element to thereby connect said members, the thread of said screw element merging at the base thereof in an annular groove lying in a plane substantially normal to the axis of said screw and located on said screw so as to receive said flat plate element when the members are connected together, a cam element in said annular groove substantially at the point of merging with said thread for initiating deflection of a portion of said slot into said thread upon rotation of said screw element in the direction opposite to the direction of rotation for engagement.

5. Means for releasably connecting a pair of members, comprising, in combination, a screw element rotatably supported in one of said members, an opening registerable with said screw element in the other of said members, and a yieldable plate element supported by the other of said members on the side of said member opposite its joining side and in spaced relation from said member, said plate element having an opening therein registerable with said screw element and said other opening, and further having a slot extending radially from said opening, the sides of said slot being spaced from each other to provide a leading edge for engagement by said screw element, whereby said screw element is adapted to yieldingly engage said plate element when the members are connected together.

6. A screw element adapted for anchorage with a thread-engaging plate member, said screw element having a threaded shank portion and a head portion, the thread on said shank portion terminating in a groove lying in a plane substantially normal to the axis of said screw, whereby said plate member is adapted to be guided by said thread into said groove.

7. A screw element adapted for anchorage with a thread-engaging flat plate member, said screw element having a threaded shank portion and a head portion, the thread on said shank portion terminating in an annular groove lying in a plane substantially normal to the axis of said screw whereby said flat plate member is adapted to be guided by said thread into said annular groove and out of engagement with said thread.

8. A screw element adapted for anchorage with a thread-engaging plate member, said screw element having a threaded shank portion and a head portion, the thread on said shank portion varying from a portion of lesser helical angle through a greater helical angle and terminating in a portion of lesser helical angle to thereby provide a thread portion intermediate the ends of said shank portion wherein the resistance to engagement of said plate member by said screw element is less than the resistance to disengagement.

9. A screw element adapted for anchorage with a thread-engaging, substantially flat plate member, said screw element having a threaded shank portion and a head portion, the thread on said shank portion terminating in a groove lying in a plane substantially normal to the axis of said screw and extending circumferentially around said screw for a distance complemental to the portion of said flat plate member which is engaged by said thread, whereby said flat plate member is adapted to be guided by said thread into said groove and to be relieved of the torsion stresses introduced in said flat plate member by said thread.

10. A screw element adapted for anchorage with a thread-engaging plate member, said screw element having a head portion and a shank portion having a thread thereon complemental in width to the thickness of said plate member, said thread terminating at the base of said shank portion in a substantially circumferential portion having a helical angle materially less than the helical angle of the immediately adjacent portion to enable rotation of said screw element in the direction of engagement with said plate member with less resistance than rotation of said screw element in the direction of disengagement, when said plate member is in engagement with said circumferential portion.

11. The invention as defined in claim 7, wherein there is a further provided camming means in said groove adjacent the point of termination of said thread in said groove for initiating disengagement of said flat plate member from said groove and engagement by said thread upon rotation of said screw in a direction reverse to the direction in which engagement with said flat plate member was accomplished.

12. Means for rotatably securing a bolt in an opening in a sheet of material, said bolt having a head portion, a shank portion, and an annular groove on said shank portion adjacent said head portion, said means comprising in combination with said bolt, a washer complemental to said head portion and adapted to be mounted on said bolt, said washer having a plurality of pronged extensions at the inner circumference thereof so that a part of said pronged extensions may be crimped outwardly to engage said sheet of material and the remainder of said pronged extensions may be pressed inwardly for engagement with said groove.

WILLIAM O. REESER.